United States Patent
Nelson et al.

(10) Patent No.: US 11,813,671 B2
(45) Date of Patent: Nov. 14, 2023

(54) MICROTEXTURED NOZZLE FOR DIRECTED ENERGY DEPOSITION WITH GREATER THAN 100 FEATURES PER SQUARE MILLIMETER

(71) Applicant: Rolls-Royce Corporation, Indianapolis, IN (US)

(72) Inventors: Scott Nelson, Carmel, IN (US); Quinlan Yee Shuck, Indianapolis, IN (US); Brandon David Ribic, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 17 days.

(21) Appl. No.: 17/157,343

(22) Filed: Jan. 25, 2021

(65) Prior Publication Data

US 2021/0229184 A1    Jul. 29, 2021

Related U.S. Application Data (60) Provisional application No. 62/966,321, filed on Jan. 27, 2020.

(51) Int. Cl.
*B22F 12/53*    (2021.01)
*B33Y 99/00*    (2015.01)
*B33Y 30/00*    (2015.01)

(52) U.S. Cl.
CPC ............ *B22F 12/53* (2021.01); *B33Y 30/00* (2014.12); *B33Y 99/00* (2014.12)

(58) Field of Classification Search
None
See application file for complete search history.

(56) References Cited

U.S. PATENT DOCUMENTS

| | | |
|---|---|---|
| 3,685,882 A | 8/1972 | Van Der Jagt |
| 3,821,510 A | 6/1974 | Muncheryan |
| 4,377,735 A | 3/1983 | Minamida et al. |
| 4,428,691 A | 1/1984 | Suzuki et al. |

(Continued)

FOREIGN PATENT DOCUMENTS

| | | |
|---|---|---|
| EP | 2329935 A1 | 6/2011 |
| EP | 2502729 A1 | 9/2012 |

(Continued)

OTHER PUBLICATIONS

KR 1998/044267 A translation (Year: 2023).*

(Continued)

*Primary Examiner* — Francisco W Tschen
*Assistant Examiner* — Guy F Mongelli
(74) *Attorney, Agent, or Firm* — Shumaker & Sieffert, P.A.

(57) ABSTRACT

A material deposition head includes a body portion and at least one nozzle. The body portion includes a first end, a second end, and a first exterior surface extending from the first end to the second end. The at least one nozzle is coupled to the body portion at or near the second end. The nozzle defines a second exterior surface and a material delivery channel that is fluidically coupled to a fluidized powder source configured to provide a plurality of particles of a material. At least one of the first exterior surface or the second exterior surface includes a microtextured surface configured to reduce a wettability of molten particles of the plurality of particles thereon.

19 Claims, 8 Drawing Sheets

(56) References Cited

U.S. PATENT DOCUMENTS

| | | |
|---|---|---|
| 4,724,299 A | 2/1988 | Hammeke |
| 4,839,495 A | 6/1989 | Kitera et al. |
| 5,122,632 A | 6/1992 | Kinkelin |
| 5,418,350 A | 5/1995 | Freneaux et al. |
| 5,477,026 A | 12/1995 | Buongiorno |
| 5,818,009 A | 10/1998 | Nakata et al. |
| 5,961,862 A | 10/1999 | Ewis et al. |
| 6,316,744 B1 | 11/2001 | Nowotny et al. |
| 6,534,745 B1 | 3/2003 | Lowney |
| 6,797,919 B1 | 9/2004 | Millard et al. |
| 7,030,337 B2 | 4/2006 | Baker et al. |
| 7,259,353 B2 | 8/2007 | Guo |
| 7,358,457 B2 | 4/2008 | Peng et al. |
| 7,550,693 B2 | 6/2009 | Hughes et al. |
| 7,605,346 B2 | 10/2009 | Harris et al. |
| 7,626,136 B2 | 12/2009 | Sato et al. |
| 8,119,950 B2 | 2/2012 | Stiles et al. |
| 8,129,657 B2 | 3/2012 | Nowotny et al. |
| 10,328,523 B2 | 6/2019 | Earle et al. |
| 2001/0008230 A1* | 7/2001 | Keicher ............ B23K 26/1482 219/121.84 |
| 2004/0099927 A1* | 5/2004 | Yin .................... H01L 21/0217 438/791 |
| 2005/0079505 A1* | 4/2005 | Tom-Moy ............ C12Q 1/6825 435/287.2 |
| 2005/0103756 A1 | 5/2005 | Baker et al. |
| 2005/0133486 A1 | 6/2005 | Baker et al. |
| 2006/0039818 A1* | 2/2006 | Tsai .................... B29C 64/129 419/61 |
| 2012/0037604 A1 | 2/2012 | Shikata |
| 2012/0045617 A1* | 2/2012 | Yasukochi ............ B29C 64/268 428/156 |
| 2012/0268524 A1* | 10/2012 | Zhao ...................... B41J 2/1628 347/45 |
| 2012/0325779 A1 | 12/2012 | Yelistratov |
| 2014/0022311 A1* | 1/2014 | Law .................... B41J 2/1404 347/56 |
| 2014/0053972 A1* | 2/2014 | Bries ........................ C09J 5/00 156/60 |
| 2015/0196975 A1 | 7/2015 | Sato et al. |
| 2017/0259377 A1 | 9/2017 | Ohno et al. |
| 2017/0297252 A1* | 10/2017 | Tyler .................... B29C 64/106 |
| 2020/0318253 A1* | 10/2020 | Hall ........................ C25F 3/16 |

FOREIGN PATENT DOCUMENTS

| | | | | |
|---|---|---|---|---|
| JP | 2000256482 A | * | 9/2000 | |
| JP | 2007173596 A | * | 7/2007 | ......... H01L 21/6831 |
| JP | 4031217 B2 | * | 1/2008 | |
| KR | 1998/044267 A | * | 9/1998 | |
| KR | 1999/003749 A | * | 1/1999 | ......... H01L 21/6831 |
| WO | 2013137289 A1 | | 9/2013 | |
| WO | WO-2016083181 A1 | * | 6/2016 | ........... B29C 64/106 |

OTHER PUBLICATIONS

KR 1999/003749 A translation (Year: 2023).*
JP-2000256482-A translation (Year: 2023).*
JP-2007173596-A translation (Year: 2023).*
JP-4031217-B2 translation (Year: 2023).*

* cited by examiner

MICROTEXTURED NOZZLE FOR DIRECTED ENERGY DEPOSITION WITH GREATER THAN 100 FEATURES PER SQUARE MILLIMETER

This application claims the benefit of U.S. Provisional Application Ser. No. 62/966,321 filed Jan. 27, 2020, the entire contents of which is incorporated herein by reference.

TECHNICAL FIELD

The present disclosure describes a head for use in additive manufacturing.

BACKGROUND

Additive manufacturing generates three-dimensional structures through addition of material layer-by-layer or volume-by-volume to form the structures, rather than removing material from an existing component to generate three-dimensional structures. Additive manufacturing may be advantageous in certain circumstances, such as rapid prototyping, repair, forming components with complex three-dimensional structures, or the like. In some examples, the additive manufacturing process may utilize a laser to melt or sinter together powdered materials in predetermined shapes to form the three-dimensional structures.

SUMMARY

The present disclosure is directed to a material deposition head used in an additive manufacturing process, which includes one or more nozzles having microtextured surfaces configured to reduce the development of collections of partially melted powder (e.g., fluggies) on the nozzles during directed energy deposition processes.

In some examples, the disclosure describes a material deposition head that includes a body portion and at least one nozzle. The body portion includes a first end, a second end, and a first exterior surface extending from the first end to the second end. The at least one nozzle is coupled to the body portion at or near the second end. The at least one nozzle defines a second exterior surface and a material delivery channel. The material delivery channel is fluidically coupled to a fluidized powder source configured to provide a plurality of particles of a material. At least one of the first exterior surface or the second exterior surface comprises a microtextured surface configured to reduce a wettability of molten particles of the plurality of particles thereon.

In some examples, the disclosure describes a system that includes a fluidized powder source and a material deposition head. The fluidized powder source is configured to provide a plurality of particles of a material. The material deposition head includes a body portion and at least one nozzle. The body portion includes a first end, a second end, and a first exterior surface extending from the first end to the second end. The at least one nozzle is coupled to the body portion at or near the second end, wherein the nozzle defines a second exterior surface and a material delivery channel. The material delivery channel is fluidically coupled to the fluidized powder source. At least one of the first exterior surface or the second exterior surface comprises a microtextured surface configured to reduce a wettability of molten particles of the plurality of particles thereon.

In some examples, the disclosure describes a method that includes positioning, to receive a surface texturing treatment, a material deposition head. The material deposition head includes a body portion including a first end, a second end, and a first exterior surface extending from the first end to the second end; and a nozzle coupled to the body portion at or near the second end, which defines a second exterior surface and a material delivery channel that is fluidically coupled to a fluidized powder source configured to provide a plurality of particles of a material. The method also includes forming a microtextured surface on at least one of the first exterior surface or the second exterior surface. The microtextured surface is configured to reduce wetting of molten particles of the plurality of particles.

The details of one or more examples are set forth in the accompanying drawings and the description below. Other features, objects, and advantages will be apparent from the description and drawings, and from the claims.

DETAILED DESCRIPTION

The present disclosure is directed to a material deposition head used in an additive manufacturing process, such as directed energy deposition (DED) material addition, which includes one or more nozzles having microtextured surfaces. The microtextured surfaces of the nozzles are configured to reduce the development of collection of partially melted powder (e.g., fluggies) on nozzles during additive manufacturing.

During additive manufacturing, a component is built by adding material to the component in sequential layers. The final component includes a plurality of layers of material. In some additive manufacturing techniques, a powder may be delivered to a substrate or surface of a previously formed layer using a carrier gas. An energy beam, such as a laser beam, may be directed at predetermined volumes of the substrate, the surface of the previously formed layer, and/or the delivered powder to heat the substrate, the surface of the previously formed layer, and/or the powder. The heating of the substrate or the previously formed layer may for a melt pool, to which the powder is added. the powder, substrate or previously formed layer may, in some examples, cause the powder to sinter or melt, thereby joining material to the substrate or previously formed layer.

Fluggies (collections of partially melted powder) may be formed during additive manufacturing and may interfere with or compromise the structure of the final component. For example, fluggies may be formed by one or more of reflected laser energy, radiant heat off the melt pool, ejected powder particles, powder ricochet from solid substrate surface, or the like. During additive manufacturing, fluggies may form on surfaces of nozzles and/or surfaces of the body of the material deposition head. At unpredictable times, the fluggies then may detach from the nozzles and become at least partially embedded in the additive manufactured component, e.g., at a melt pool. An embedded fluggy may define an inclusion or flaw in the additively manufactured component that may compromise mechanical properties of the additively manufactured component. In some examples, an embedded fluggy may act as a crack initiation site. Alternatively, or additionally, fluggies may disrupt a steam of deposition material at the nozzle or surface of the component. The disrupted stream may provide uneven powder delivery to the melt pool which may cause unstable and/or unpredictable material build.

Reducing coalescence or amalgamation of fluggies on the nozzle and/or body of the material deposition head reduces or eliminates the impact of embedded fluggies in the additively manufactured part. For example, a nozzle having surface(s) that decrease the wettability of the softened or molten deposition material will reduce coalescence of the at least partially melted particles, reducing formation of fluggies that may affect the build. In some examples, controlling fluggies was accomplished using various aerosolized oils sprayed on to nozzles to form an organic barrier between the nozzle and molten metal. The present disclosure describes microtextured nozzles configured to reduce buildup of at least partially melted powder particles and, thereby, the formation of fluggies.

The microtextured surfaces of the nozzles may include any suitable surface texture formed by any suitable method. For example, a textured surface including a collection of regular pillars, cylinders, hour glasses, cones, pyramids, or hemispheres may be formed by subtractive manufacturing, such as laser ablation, etching, or the like. A jagged and irregular textured surface may be formed by a coating process, such as chemical vapor deposition (CVD), plasma vapor deposition (PVD), thermal spraying, plasma spraying, electrolytic deposition, or the like. The microtextured surface is configured to trap gasses between an an at least partially melted powder particle (e.g., ricocheted from the surface to which material is being added) and the microtextured surface of the nozzle. The entrapped gases may reduce wetting of the powder particle on the microtextured surface. Reducing wetting may allow the powder particle to run off the nozzle without forming a fluggy.

In some examples, individual features of a microtextured surface may have a cross-section ranging from about 0.01 square microns ($\mu m^2$) to about 1 $\mu m^2$. Additionally, or alternatively, a microtextured surface may include highly peaked structures. The highly peaked structures may be tightly spaced across the nozzle surface. For example, a spacing between peaks the highly peaked structures may be less than about 40 mil (1.016 mm). The differential in surface topology, e.g., peak to valley distance normal to the mean surface of the nozzle outer diameter) and tight spacing (peak to peak, tangential distance along mean surface of nozzle outer diameter between peaks) of these pillars may effectively reduce the extent of surface area on the nozzles which are normal to ejecta trajectories (able to facilitate fluggy adhesion) and consequentially will increase the probability of further ricochet of particles/fluggies (i.e., may not allow particles to adhere to the nozzles and form fluggies).

Figure 1:
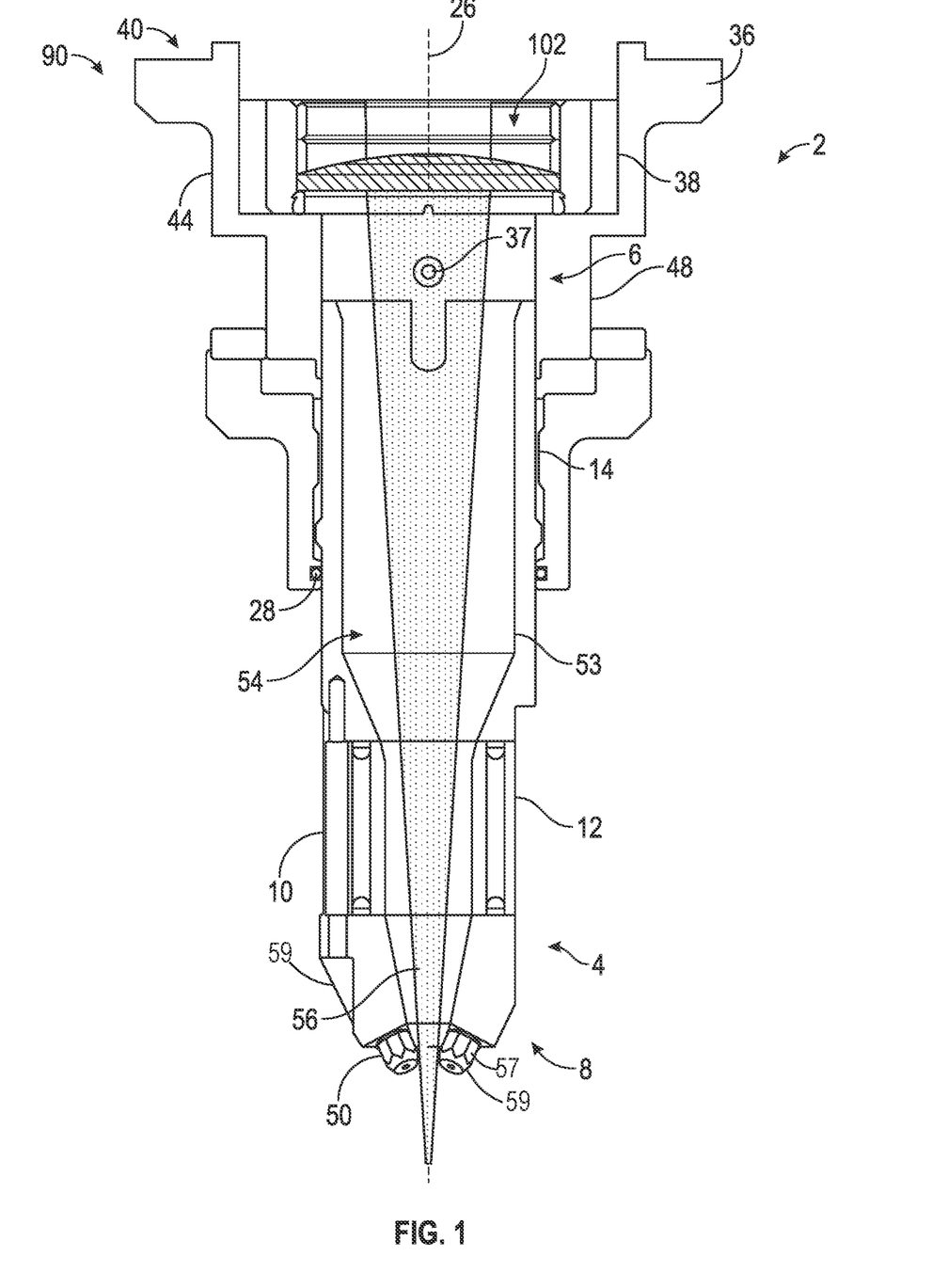
FIG. 1 is a conceptual diagram illustrating a radial cross-section of an example material deposition head.

FIG. 1 is a conceptual diagram illustrating a radial cross-section of an example material deposition head including nozzles having microtextured surfaces. Certain features of the example material deposition head of FIG. 1 are described in reference to FIGS. 2-7. As shown in FIG. 1, an example material deposition head 2 includes a first body portion 4 including a first end 6 and a second end 8. An exterior surface 10 of first body portion 4 may extend from first end 6 to second end 8.

Figure 4:
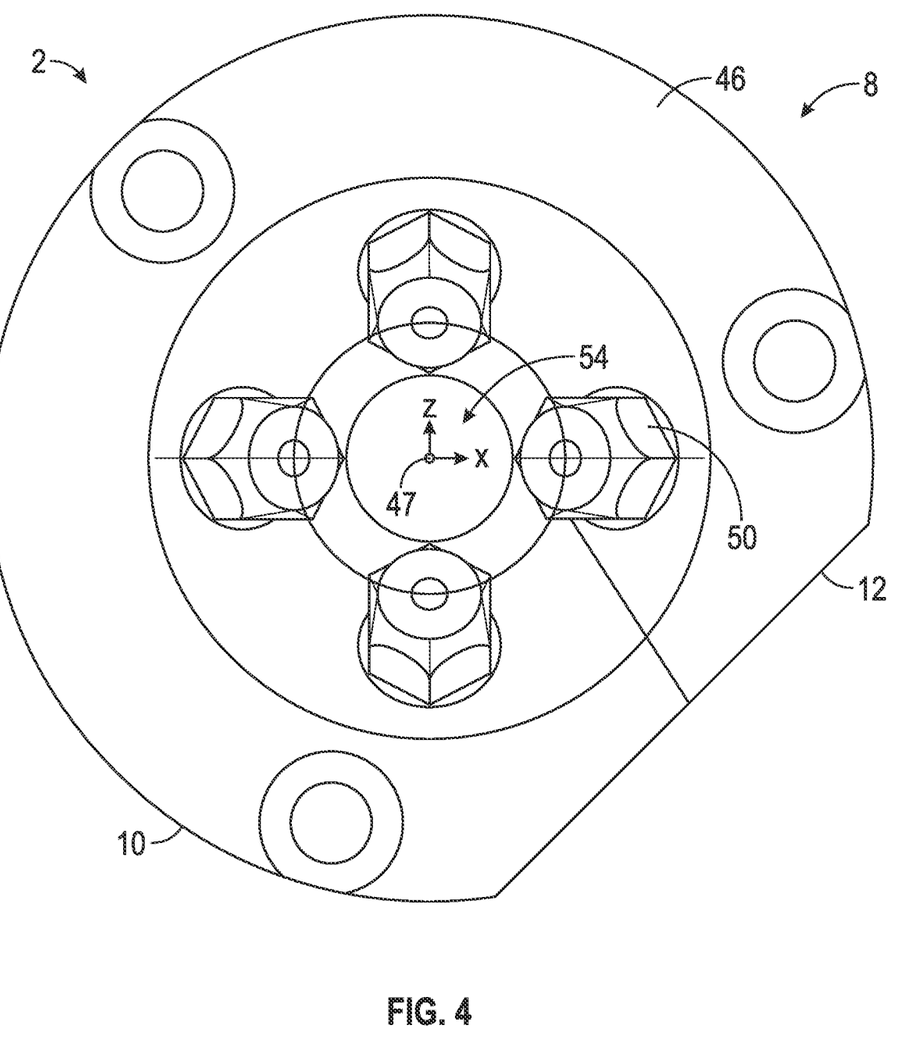
FIG. 4 is a conceptual diagram illustrating a bottom view of the example material deposition head of FIG. 3 in the direction of line A.

In some examples, exterior surface 10, in radial cross-section of first body portion 4, may include one or more curved, planar, or polygonal shapes, portions, or sides. For example, at least a portion (or all) of first body portion 4 may be substantially cylindrical (e.g., cylindrical or nearly cylindrical within common material deposition head manufacturing tolerances). In some examples, at least a portion of exterior surface 10 may be planar. For example, as shown in FIGS. 1, 2, and 4, a planar portion 12 of a substantially cylindrical exterior surface 10 may be positioned proximate to second end 8 of first body portion 4 of material deposition head 2.

In some examples, as noted, planar portion 12 of a substantially cylindrical surface 10 of first body portion 4 may allow material deposition head 2 to access narrower spaces during operation. For example and without limitation, inclusion of planar portion 12 in the design of first body portion 4 may enable material deposition head 2 to more easily access leading edges, trailing edges, blade tips of blisk airfoils, or other components of gas turbine engines. Moreover, in some examples, material deposition head 2 may be configured to deposit material in preferred orientations, as compared to material deposition heads lacking features such as planar portion 12 of first body portion 4.

Figure 2:
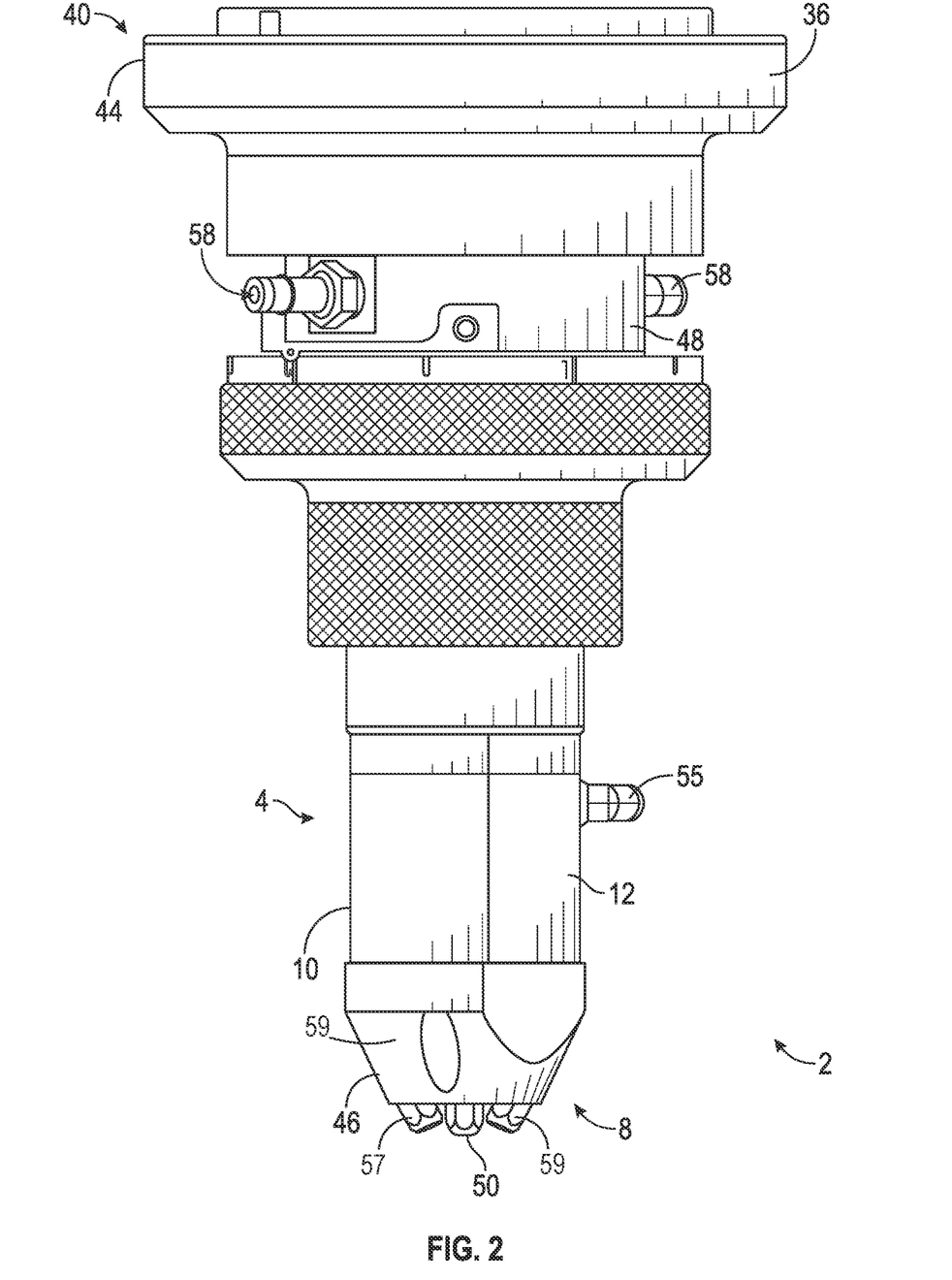
FIG. 2 is a conceptual diagram illustrating a side view of an example material deposition head.

In some examples, exterior surface 10 of first body portion 4 also may include a chamfer 46 proximate to second end 8 of first body portion 4 that tapers radially inwardly, as shown in FIG. 2. FIG. 2 is a conceptual diagram illustrating a side view of material deposition head 2. Chamfer 46 also may enhance the ability of material deposition head 2 to access parts or portions of parts having minimal clearance or small dimensions.

Figure 3:
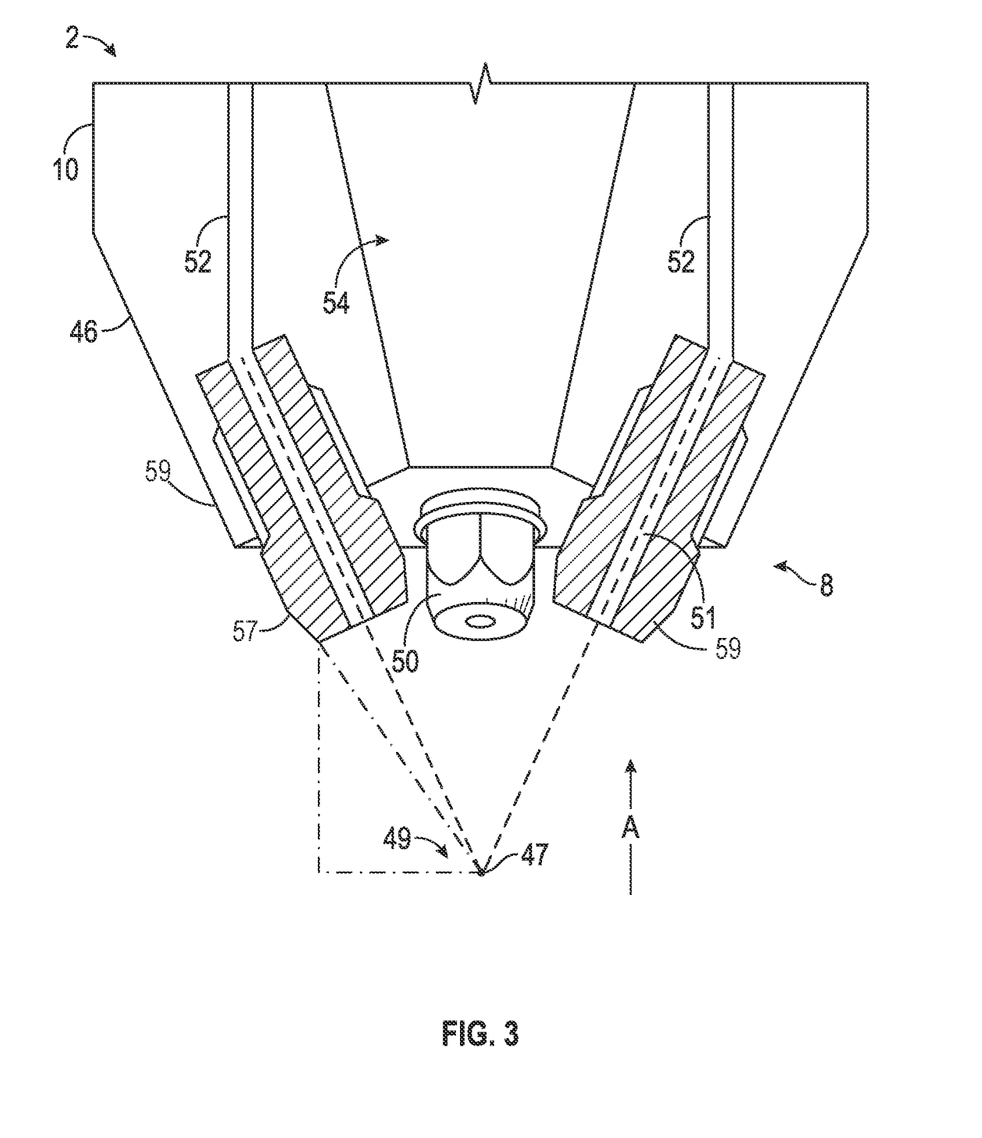
FIG. 3 is a cross-sectional view of a portion of an example material deposition head.

First body portion 4 also includes at least one nozzle 50 (hereinafter, nozzles 50), which may be coupled proximate to or at second end 8 of first body portion 4. FIG. 3 is a cross-sectional view of first body portion 4 of material deposition head 2, and shows additional details of nozzles 50. The nozzles 50 may defines an exterior surface 57 and at least one material delivery channel 52. Material delivery channel 52 is fluidically coupled to a fluidized power source. In this way, material delivery channel 52 is configured to carry a fluidized powder from the fluidized powder source to the nozzles 50. For example, the at least one material delivery channel 52 may open to an exterior surface of material deposition head, such as exterior surface 10 of first body portion 4. In such an example, material delivery channel 52 may extend from exterior surface 10 of first body portion 4 to the nozzles 50, such that a fluidic connection is made between a fluidized powder source coupled to exterior surface 10 and the nozzles 50.

In some examples, at least one material delivery channel 52 may include a single delivery channel coupled to exterior surface 10, which branches into a plurality of material delivery channels, such that each material delivery channel terminates at and is fluidically connected to a respective nozzle 50 of the nozzles 50. For example, first body portion 4 may define at least one material delivery channel 52 that branches into four material delivery channels. In other examples, multiple material delivery channels may open to an exterior surface of the material deposition head, such as exterior surface 10 of first body portion 4, and lead to multiple nozzles. In examples including multiple material delivery channels terminating at respective nozzles 50, a fluidized powder source and the material delivery channels may be configured such that an approximately even volume of fluidized powder is delivered to each of nozzles 50 during the additive manufacturing process. Further, in some examples, at least one material delivery channel may be connected to a fluid source (e.g., a gas source), while at least one other material delivery channel may be connected to a material source (e.g., a powder source).

In some examples, the material being added to the substrate during the additive manufacturing process may flow through material delivery channels 52 as a fluidized powder, in which a flowing fluid (e.g., carrier gas) carries powder of the material through material delivery channels 52. For example, a carrier gas may include one or more of helium, argon, a substantially inert gas, or another gas suitable based on the reactivity (or lack thereof) with the substrate or the material. As used herein, a substantially inert gas may include a gas that does not react with a substrate or the material. In other examples, non-inert gases (e.g., air) may be utilized as a carrying fluid for powder, or for purging through an internal passage in material deposition head 2. In some examples, the carrier gas may reactive with one or more constituents of the substrate or the material. For example, a carrier gas may be selected to oxidize a constituent metal of the material.

Each of the nozzles 50 may be attached to first body portion 4 by any suitable one or more mechanisms that allow a secure fitting. Further, each of the nozzles 50 may each include a channel 51 that is fluidically coupled to a respective material delivery channel 52 of first body portion 4. Material carried by a fluid, such as a fluidized powder, may be expelled via channel 51 of nozzle 50 and directed into an energy beam and/or adjacent to a surface of a substrate during the additive manufacturing process. The material carried by the fluid, to be deposited adjacent to a substrate, may include, for example, at least one of a metal; an alloy, such as a nickel-based alloy, a cobalt-based alloy, an iron-based alloy, a titanium-based alloy, or the like; a ceramic; a polymer; or combinations thereof. In some examples, the material may include a metal or alloy and ceramic or a metal or alloy and polymer.

During operation, particles directed to a surface of a substrate, e.g., a build surface, may be heated to at least partially melt and ricochet of the surface of the substrate toward material deposition head 2, contacting a portion of material deposition head 2, such as first body portion 4 and/or nozzles 50. Exterior surface 10 of first body portion 4, exterior surface 57 of nozzles 50 may include a microtextured surface 59 configured to reduce wetting of molten particles ricocheted. Reducing the wetting of the molten particles may prevent buildup of molten particles and, thereby, may reduce fluggies and/or the embedded fluggies that may compromise the structure of the final component.

In some examples, microtextured surface 59 may include a rough surface configured to trap gas between molten particles and exterior surfaces 10 and/or 57. Additionally, or alternatively, microtextured surface 59 may be configured to generate a low surface energy that reduces wettability. For example, microtextured surface 59 may have a surface energy that would prevent the envelopment of an individual feature by the molten droplet through a lack of wetting and would therefore float atop the plurality of features. In some examples, a contact angle of a molten particle on the features may be indicative of the wettability of surfaces 10 and/or 57. For example, a contact angle greater than about 45-degrees, such as greater than about 90-degrees or greater than about 135-degrees, may be indicative of a reduced wettability or a negligible wettability of a molten particle on surfaces 10 and/or 57.

Microtextured surface 59 may be defined by the substrate defining first body portion 4 and/or nozzles 50, or defined by a coating on a surface of first body portion 4 and/or nozzles 50. Microtextured surface 59 may include an irregular surface or a patterned surface. In some examples, an irregular surface may include, for example, substantially randomly positioned (e.g., nonregular) features. For example, an irregular surface may be formed by an additive manufacturing process, a coating process, CVD, PVD, thermal spraying, plasma spraying, electrolytic deposition, or the like. The features may include any suitable shape, such as, for example, rectilinear, curvilinear, hemispherical, or the like.

In some examples, a patterned surface may include a plurality of regularly repeating features. For example, the plurality of regularly repeating features may include features formed by subtractive manufacturing techniques, laser ablation, etching, or the like. The plurality of regular features may include any suitable shape, such as, for example, one or more of regular pillars, cylinders, hour glasses, cones, pyramids, or hemispheres may be formed by subtractive manufacturing, laser ablation, etching, or the like.

The features of either the irregular or patterned microtextured surface 59 may include any suitable size and any suitable spacing. In some examples, a cross sectional dimension of the features may be less than a cross sectional dimension of an average molten particle incident on surfaces 10 and/or 57 during a deposition process. For example, in examples in which an average molten particle cross sectional dimension is between 50 microns to 90 microns, the cross sectional dimension of the features may be less than about 90 microns, such as less than about 50 microns. By selecting a feature cross sectional dimension less than a cross sectional dimension of the molten particles, a single molten particle may contact two or more features when indecent on surfaces 10 and/or 57.

In some examples, a spacing of adjacent features may be less than a cross sectional dimension of an average molten particle incident on surfaces 10 and/or 57 during a deposition process. For example, in examples in which an average molten particle cross sectional dimension is between 50 microns to 90 microns, a spacing of adjacent features may be less than about 90 microns, such as less than about 50 microns. By selecting a feature spacing less than a cross sectional dimension of the molten particles, the features may be configured to reduce or prevent molten particles from being caught between adjacent features.

Both feature size and spacing may be subject to variance due to manufacturing technique or process conditions, hence the feature size and spacing may include an average, a mean, or a median, size or spacing of actual features. By having a size and/or spacing less than a cross sectional dimension of the molten particles, the features are configured to reduce a surface area of surfaces 10 and/or 57 capable of contacting a molten particle. Reducing a surface area in contact with a molten particle may reduce the surface energy and/or reduce wettability of the molten particle on surface 10 and/or 57.

In some examples, a density of the features may be greater than about 100 features per square millimeter ($mm^2$), such as greater than about 400 features per $mm^2$, or greater than about 1000 features per mm². In some examples, a density of the features may be within a range from about 100 to about 625 features per mm². The density of features may vary between adjacent areas due to tolerances of manufacturing techniques or effect of process parameter selection.

In some examples, features of microtextured surface 59 may be selected based on a material of the molten particles. For example, a wettability of a first molten particle material on microtextured surface 59 may be different than a wettability of a second, different molten particle material on microtextured surface 59. In some examples, the difference in wettability may be due to, for example, a viscosity of a respective molten particle material, a surface energy of the molten particle material, or the like.

In some examples, the angle at which nozzles 50 delivers a fluidized powder may be adjustable. For example, the nozzles 50 may be positioned at an acute angle 49 (see FIG. 3), or a right angle with respect to an underlying substrate (not shown). In this way, fluidized powder may be directed toward a selected location (e.g., a selected spot size) along energy beam 56 (FIG. 1). In some examples, a more acute angle between one or more fluidized powder streams and a substrate may be utilized to allow for a greater addition of material in substantially horizontal directions on the substrate. Additionally, or alternatively, a substrate may be movable in at least one dimension relative to material deposition head 2 so that material deposition head 2, and/or components thereof, interact with a selected location on the substrate.

FIG. 4 is a conceptual diagram illustrating a bottom view of the example material deposition head of FIG. 3 in the direction of line A. As shown in FIG. 4, in some examples, nozzles 50 (e.g., four nozzles) may be coupled to second end 8 of first body portion 4. In some examples, the nozzles 50 may be positioned so that a respective stream of fluidized powder from each nozzle crosses, for example, at a focal point 47 or focal region along an energy beam (not shown) that passes through internal passage 54.

In some examples, first body portion 4 also may include one or more means for engaging with other components of material deposition head 2. For example, at least a portion of exterior surface 10 of first body portion 4 may include threading 14. As shown in FIG. 1, in some examples, a substantially cylindrical portion of exterior surface 10 may include threading 14 proximate to first end 6 of material deposition head 2. Threading 14 may have any suitable pitch between threads that facilities precise axial translation of first body portion 4. In some examples, deposition head 2 also may include one or more components that engage with first body portion 4 to facilitate axial translation of first body portion 4.

In some examples, material deposition head 2 also includes a second body portion 90. In some examples, second body portion 90 may house optical components 102 that focus an energy beam to a focal spot external to material deposition head 2 and proximate to second end 8 of first body portion 4. In some examples, a first end 40 of second ring 36 may define a cavity into which additional components of material deposition head 2, or additional components associated with the additive manufacturing process, may be disposed. For example, as shown in FIG. 1, certain components associated with an energy source may be disposed within a cavity in second ring 44 proximate to first end 40, such as optical components 102 including a focusing lens. In some examples, the focusing lens within the cavity in second ring 44 may be moved or translated upwardly, to allow more space for first body portion 4 to translate upwardly.

Material deposition head 2, and its various components, generally may be composed of any suitable materials that do not interfere with its operation. For example, material deposition head 2 may include one or more materials that do not react with any gas that may be purged through the head, or degrade in the presence of a high-temperature energy beam (such as a laser beam) that may pass through the head. Suitable materials may include, but are not limited to, a metal, such as aluminum or copper, an alloy, such as an aluminum alloy, a copper alloy, stainless steel, a ceramic, or the like. Materials with high thermal conductivity and low laser absorption coefficients such as silver, aluminum, copper, gold, and nickel to some degree, are advantageous in that reduced nozzle temperature will reduce molten metal adhesion. Pure metals such as molybdenum and tungsten very high melting temperatures which also reduce molten metal adhesion. Such materials may, in some examples, exhibit relatively little wear from a fluidized powder or energy beam that passes therethrough.

In some examples, material deposition head 2 may include one or more seals disposed between various components. The seals may be configured and positioned to protect an interior portion of material deposition head 2 (e.g., interior components or an interior volume) from contamination from a number of sources, such as gases in the external environment, or solid, liquid, or gaseous material deflected from a substrate or melt pool during the deposition process. In some examples, one or more seals (such as seal 28) disposed within material deposition head 2 may be composed of an elastomer, rubber, a ceramic, or the like. Such materials may be designed to avoid degradation at elevated temperatures utilized in the additive manufacturing process. As one example, one or more seals may include polytetrafluoroethylene (PTFE). For instance, one or more seals may be Kalrez® seals that include Teflon®, a product manufactured by DuPont. Example seals may retain their mechanical properties (e.g., elasticity) at elevated temperatures.

First body portion 4 also may include an interior surface 53 that defines an internal passage 54 within first body portion 4. Internal passage 54 may extend from first end 6 to second end 8 of first body portion 4 and be configured to permit passage therethrough of energy beam 56 generated by an energy source. In some example material deposition heads, internal passage 54 may define a diameter sufficient to allow a collimated energy beam 56 with a diameter of about one inch being focused by optical component 102 to pass through internal passage 54 and exit second end 8 without clipping of the energy beam 56. In general, energy beam 56 may pass through internal passage 54 parallel to (e.g., coaxial with) axis 26, exit material deposition head 2 at second end 8, and impact a material discharged from nozzles 50 adjacent to a substrate. Energy from energy beam 56 may be absorbed by the material, such that a pool of molten material is formed on the substrate.

In some examples, interior surface 53 may be substantially annular in radial cross-section (for example, annular or nearly annular), where the circumference of interior surface 53 is less than a circumference of exterior surface 10 of first body portion 4. As shown in FIG. 1, an inner circumference of first body portion 4 defined by interior surface 53 may decrease, and internal passage 54 defined by interior surface 53 may narrow, when measured in a direction moving from first end 6 toward second end 8 of first body portion 4 of material deposition head 2. In other examples, an inner circumference of first body portion 4 defined by interior surface 12 may stay substantially constant when measured in a direction moving from first end 6 toward second end 8.

In some examples, a gas may be purged through internal passage 54 of first body portion 4, flowing from first end 6 to second end 8 of first body portion 4. The gas may be sourced from, for example, a gas source coupled to material deposition head 2. In some examples, such a gas source may be coupled to second ring 36 of material deposition head 2. For example, a gas source may be fluidically coupled to internal passage 54 of first body portion 4 via one or more connectors 58 (see FIG. 2) attached to portion 48 of exterior surface 44 of second ring 36. In some example implementations, gas from the gas source may enter internal passage 54 via an inlet in second body portion 90, for example, via an inlet 37 in interior surface 38 of second ring 36 as shown in FIG. 1.

In example material deposition heads that include a narrowing inner circumference of first body portion 4, the velocity of gas flowing through internal passage 54 may increase as the gas flows from first end 6 to second end 8, increasing cooling or heat transfer when the gas deflects from the substrate back toward material deposition head 2. A gas passing through internal passage 54 with an increased velocity also may provide improved protection to optics components (e.g., lenses or an energy source, such as a laser) from splatter (e.g., metal splatter from the melt pool of material deposited on a substrate). In some examples, a narrowing internal passage 54 may create additional space at second end 8 of first body portion 4 for placement of additional components, such as one or more nozzles 50 coupled to second end 8 of first body portion 4.

In some examples, material deposition head 2 may further include one or more additional components affixed to one or more exterior surfaces of material deposition head 2, such that the one or more additional components are configured to indicate an axial position of first body portion 4 and/or one or more nozzles 50 coupled to first body portion 4.

Figure 5:
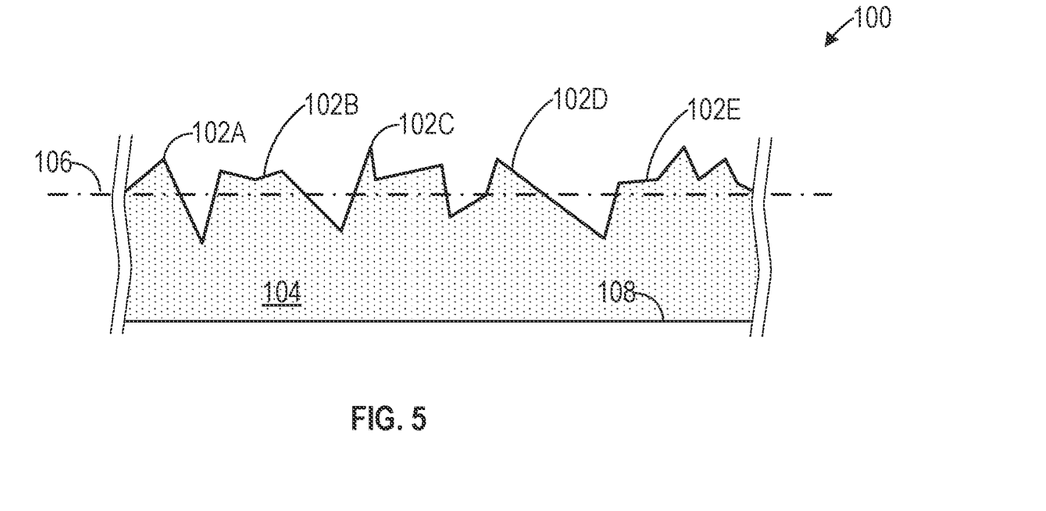
FIG. 5 is a conceptual diagram illustrating an example of an irregular microtextured surface.

FIG. 5 is a conceptual diagram illustrating an example of an irregular microtextured surface 100. Irregular microtextured surface 100 may be the same as or substantially similar to microtextured surface 59 discussed above in reference to FIGS. 1-4, except for the differences described herein.

Irregular microtextured surface 100 includes substantially randomly positioned (e.g., nonregular) and shaped features. For example, irregular microtextured surface 100 includes a plurality of features 102A-102E (collectively, irregular features 102) formed in substrate 104. In some examples, substrate 104 includes the substrate defining a body portion or nozzle of a material deposition head. For example, substrate 104 may define at least a portion of body portion 4 or nozzles 50 of material deposition head 2. In other examples, substrate 104 may include a coating dispose on, e.g., disposed directly on, exterior surface 10 of first body portion 4 or exterior surface 57 of nozzles 50.

Irregular features 102 include rectilinear features that are substantially random in shape, size, and spacing. For example, each of features 102 is dissimilar as compared to adjacent features 102. Features 102 extend above and below a nominal plane 106. Nominal plane 106 may include an average of each peak and valley of features 102. For example, an average distance of each point along irregular surface 100 relative to a reference line 108 may result in nominal plane 106.

In some examples, substantially random shape, size, and spacing may include a nonrepeating or nonpatterned shape, size, and spacing. In some examples, irregular features may include one or two of similar shapes, similar sizes, or similar spacings, but have at least one of a substantially random shape, size, or spacing. Although illustrated as rectilinear shapes, in other examples, features 102 may include any other suitable shape, such as, for example, curvilinear, hemispherical, or the like.

Figure 6:
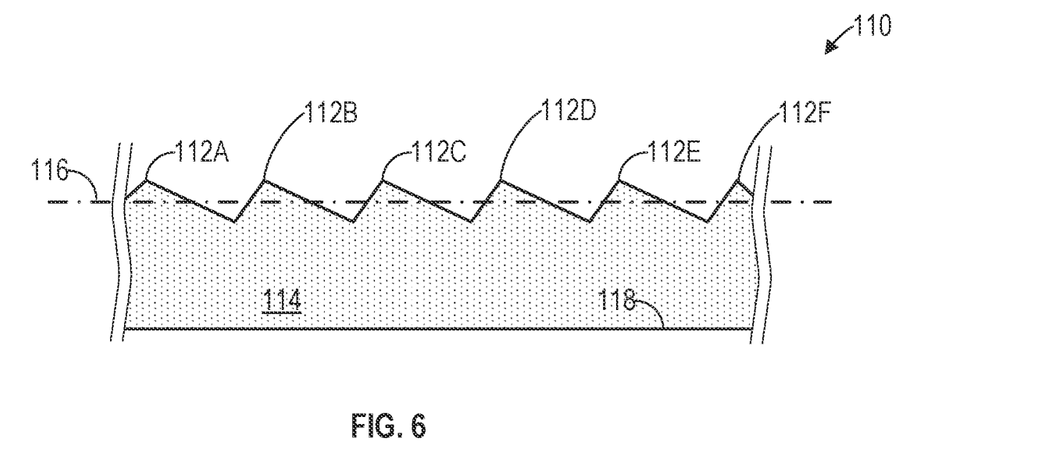
FIG. 6 is a conceptual diagram illustrating an example of a patterned microtextured surface.

FIG. 6 is a conceptual diagram illustrating an example of a patterned microtextured surface 110. Patterned microtextured surface 110 may be the same as or substantially similar to microtextured surface 59 discussed above in reference to FIGS. 1-4, except for the differences described herein.

Patterned microtextured surface 110 includes substantially regularly repeating features. In some examples, patterned microtextured surface 110 may include substantially similarly shaped features. For example, patterned microtextured surface 110 includes a plurality of features 112A-112E (collectively, patterned features 112) formed in substrate 114. In some examples, substrate 114 includes the substrate defining a body portion or nozzle of a material deposition head. For example, substrate 114 may define at least a portion of body portion 4 or nozzles 50 of material deposition head 2. In other examples, substrate 114 may include a coating disposed on, e.g., dispensed directly on, exterior surface 10 of first body portion 4 or exterior surface 57 of nozzles 50.

Patterned features 112 include rectilinear features that are substantially uniform in shape, size, and spacing, e.g., uniform within the tolerances of common manufacturing techniques, such as subtractive manufacturing techniques, laser ablation, etching, or the like. For example, each of features 112 is substantially similar as compared to adjacent features 112. Features 112 extend above and below a nominal plane 116. Nominal plane 116 may define an average of each peak and valley of features 112. For example, an average distance of each point along patterned surface 110 relative to a reference line 118 may result in nominal plane 116.

In some examples, patterned surface 110 may include features 112 having more than one shape, such as a first feature having a first shape and a second, different feature having a second, different shape. In some examples, patterned surface 110 may include features 112 having more than one size, such as a first feature having a first size and a second, different feature having a second, different size. In some examples, patterned surface 110 may include substantially similar shapes that are randomly spaced, randomly sized, or both. Although illustrated as rectilinear shapes, in other examples, features 102 may include any other suitable shapes, such as, for example, curvilinear, hemispherical, cylindrical, hourglass shaped, conical, pyramidal, or the like.

Figure 7:
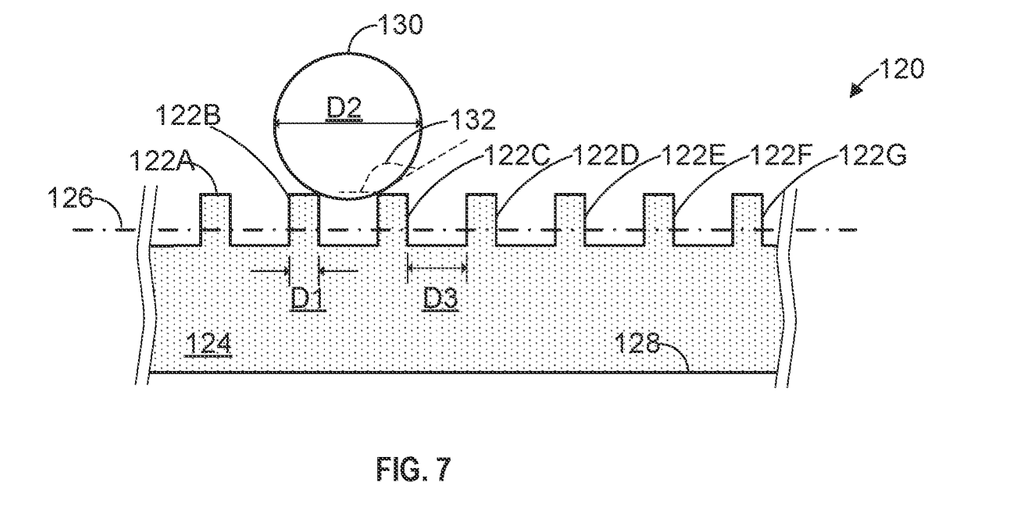
FIG. 7 is a conceptual diagram illustrating an example molten particle incident on a patterned microtextured surface.

As discussed above, the features of either the irregular or patterns microtextured surface 59 may include any suitable size and any suitable spacing configured to reduce the wettability of a molten particle incident on surface 59, such as material ricocheted back toward a material deposition head. FIG. 7 is a conceptual diagram illustrating an example molten particle 130 incident on a patterned microtextured surface 120. Patterned microtextured surface 120 includes a plurality of features 122A-122F (collectively, patterned features 122) formed in substrate 124. Patterned microtextured surface 120 may be the same as or substantially similar to patterned microtextured surface 110 discussion above in reference to FIG. 6.

As illustrated in FIG. 7, a cross sectional dimension D1 of features 122 is less than a cross sectional dimension D2 of molten particle 130. For the purposed of illustration, molten particle 130 is representative of an average molten particle incident on patterned surface 120 (e.g., surfaces 10 and/or 57) during a deposition process. In examples in which cross sectional dimension D2 of molten particle 130 is between 50 microns to 90 microns, the cross sectional dimension D1 of features 122 may be less than about 90 microns, such as less than about 50 microns. By forming features 122 with a cross sectional dimension D1 less than a cross sectional dimension D2 of molten particle 130, molten particle 130 may contact two or more features 122 when indecent on surface 120, thereby reducing a wettability of molten particle 130.

In some examples, a spacing D3 of adjacent features 122 may be less than cross sectional dimension D2 of molten particle 130. For example, in examples in which cross sectional dimension D2 of molten particle 130 is between 50 microns to 90 microns, a spacing D3 of adjacent features 122 may be less than about 90 microns, such as less than about 50 microns. By selecting feature spacing D3 less than a cross sectional dimension D2 of molten particle 130, features 122 are configured to reduce or prevent molten particles 130 from being caught between adjacent features 122.

Additionally, or alternatively, a shape and/or size of features 122 may affect a contact angle 132 of molten particle 130 incident on surface 120. In some examples, contact angle 132 may be indicative of the wettability of surface 120. Contact angle 132 is about 135-degree. In other examples, contact angle 132 may be greater than about 45-degrees, such as greater than about 90-degrees, or greater than 135-degrees.

Figure 8:
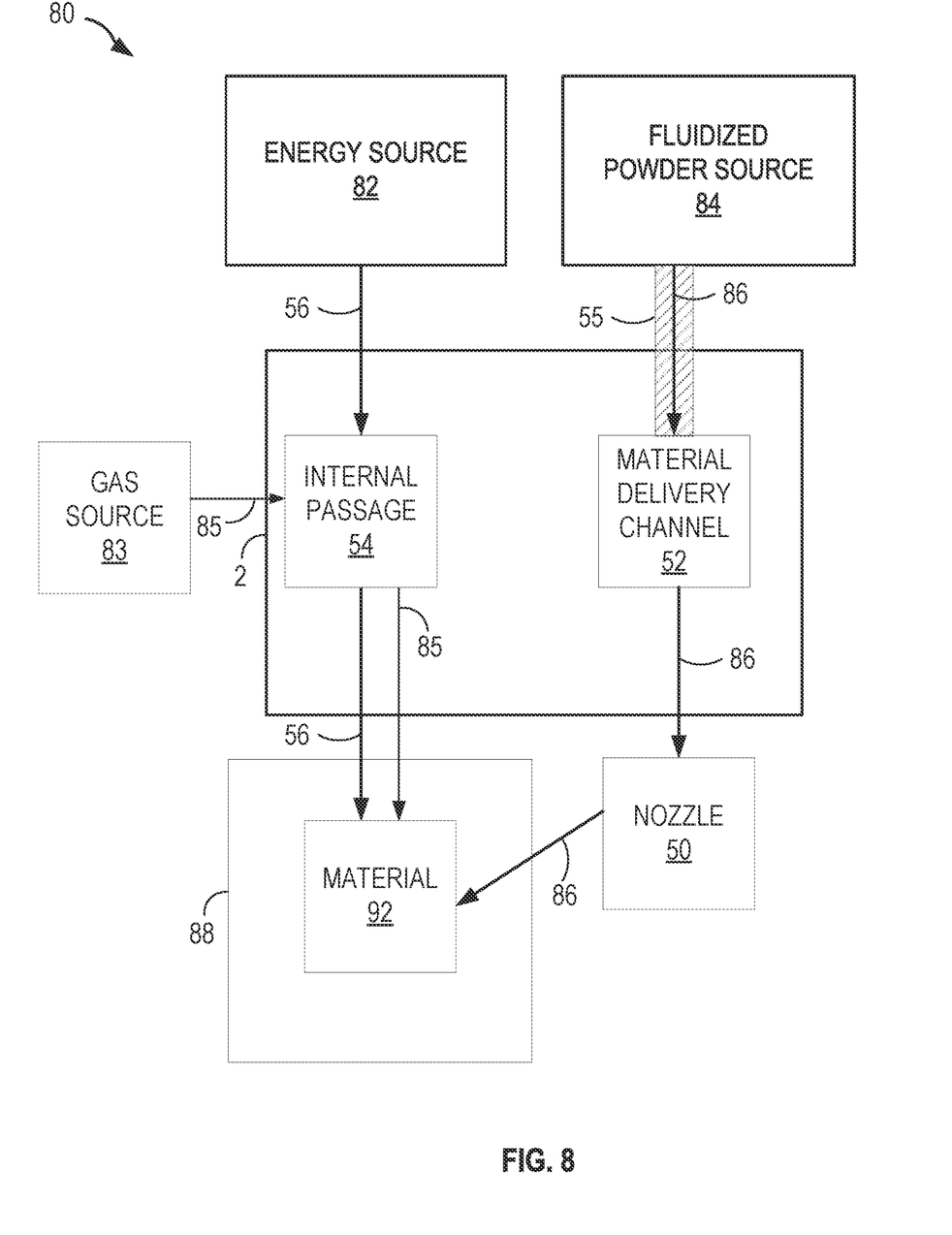
FIG. 8 is a conceptual block diagram of an example system including a material deposition head.

FIG. 8 is a conceptual block diagram of an example system 80 including a material deposition head 2. For example, material deposition head 2 of system 80 may include some or all of the various features described herein with respect to material deposition head 2 and FIGS. 1-7. As described above, first body portion 4 of material deposition head 2 may define at least one material delivery channel 52 that fluidically connects and extends from, for example, exterior surface 10 of first body portion 4 to nozzles 50. The at least one material delivery channel 52 of first body portion 4 of material deposition head 2 may be configured to permit passage of a fluidized powder 86 therethrough, as represented in FIG. 8. Fluidized powder 86 may be supplied by a fluidized powder source 84 coupled to at least one material delivery channel 52 of first body portion 4 of material deposition head 2 of system 80. Fluidized powder 86 may include, for example, metal, alloy, ceramic, or polymeric particles carried by a gas. Fluidized powder source 84 may include, for example, a source of helium, argon, or other substantially inert gas fluidically coupled with a source of powder, such as metal, alloy, ceramic, or polymeric particles. In some examples, fluidized powder source 84 may be subject to pressure or vacuum, to enable delivery of fluidized powder 86 from fluidized powder source 84 through a tube (such as connector 55), material delivery channel 52, and channel 51 of one or more nozzles 50 (see FIG. 3). In some examples, fluidized powder source 84 may be configured to continuously feed between about 0.2 grams and about 8 grams of material per minute through at least one material delivery channel 52 to be deposited on a substrate.

System 80 of FIG. 8 also may include an energy source 82 coupled to (e.g., mechanically coupled to, or positioned in alignment with) internal passage 54 defined by interior surface 53 of first body portion 4 of material deposition head 2. Energy source 82 may generate an energy beam 56 that passes through internal passage 54 and heats a material 92 within a stream of fluidized powder 86. Further, energy source 82 may be selected to provide energy beam 56 with a predetermined wavelength or wavelength spectrum that may be absorbed by and heat material 92. As described above, material 92 may include, for instance, metal, alloy, ceramic, or polymeric particles.

In some examples, energy source 82 may include a laser, plasma source, plasma arc, electrical arc, ultraviolet energy source, infrared energy source, induction coil, or another source of energy coupled to material deposition head 2. Example laser sources include a $CO_2$ laser, a Nd:YAG laser, a Fibre laser, or the like. A laser may operate during the additive manufacturing process to heat, sinter, or melt the material being added or joined to a substrate 88 at temperatures in the range of 1000° C. to 4000° C. with respect to materials such as polymers, including copolymers, thermoplastics, and thermosets; ceramics, including carbides, nitrides, and oxides; metals, alloys (e.g., nickel-base alloys and titanium-based alloys), ferrous metallic alloys, or non-ferrous metallic alloys. Thus, an example system 80 may include a laser positioned to direct a laser beam through internal passage 54 to impact material 92 carried in a stream of fluidized powder 86 and directed into the laser beam via nozzles 50.

In some examples, an example system 80 of FIG. 8 may further include a gas source 83 that is fluidically coupled to internal passage 54 of first body portion 4. For example, gas source 83 may be coupled to portion 48 of second ring 36 via one or more connectors 58 (e.g., two connectors 58, see FIG. 2). In some examples, two connectors 58 may be diametrically opposed in their attachment to portion 48 of second ring 48 to enable an optimal, even flow of gas through internal passage 54.

Thus, as represented in FIG. 8, gas source 83 may be configured to purge a gas 85 through internal passage 54, such as helium, argon, or any other substantially inert gas. Purging a substantially inert gas 85 through internal passage 54 may, for example, maintain the purity of the environment surrounding deposition (e.g., prevent or reduce oxidation of deposited metal) and exert a pressure to prevent or reduce deflection of solid or liquid material back into internal passage 54 or on to exterior or interior components of material deposition head 2. Thus, gas 85 flows through internal passage 54, exits second end 8 of first body portion 4, and impacts substrate 88 and/or material 92 to maintain an outward flow of gas from material deposition head 2.

In addition, in some example systems of this disclosure, a gas takeoff assembly may be coupled with material deposition head 2. For example, as shown in FIG. 6, a gas takeoff assembly 71 may be positioned to engage exterior surface 10 of first body portion 4. Gas takeoff assembly 71 may include one or more sensors adjacent to the deposition area. For example, one or more sampling inlets may be respectively associated with one or more sensors to sense atmospheric conditions adjacent to the location at which material deposition is occurring. For example, the one or more sensors may sense oxygen concentration to reduce or substantially prevent oxidation of deposited metal material and/or may sense moisture in the atmospheric environment surrounding material deposition head 2.

Figure 9:
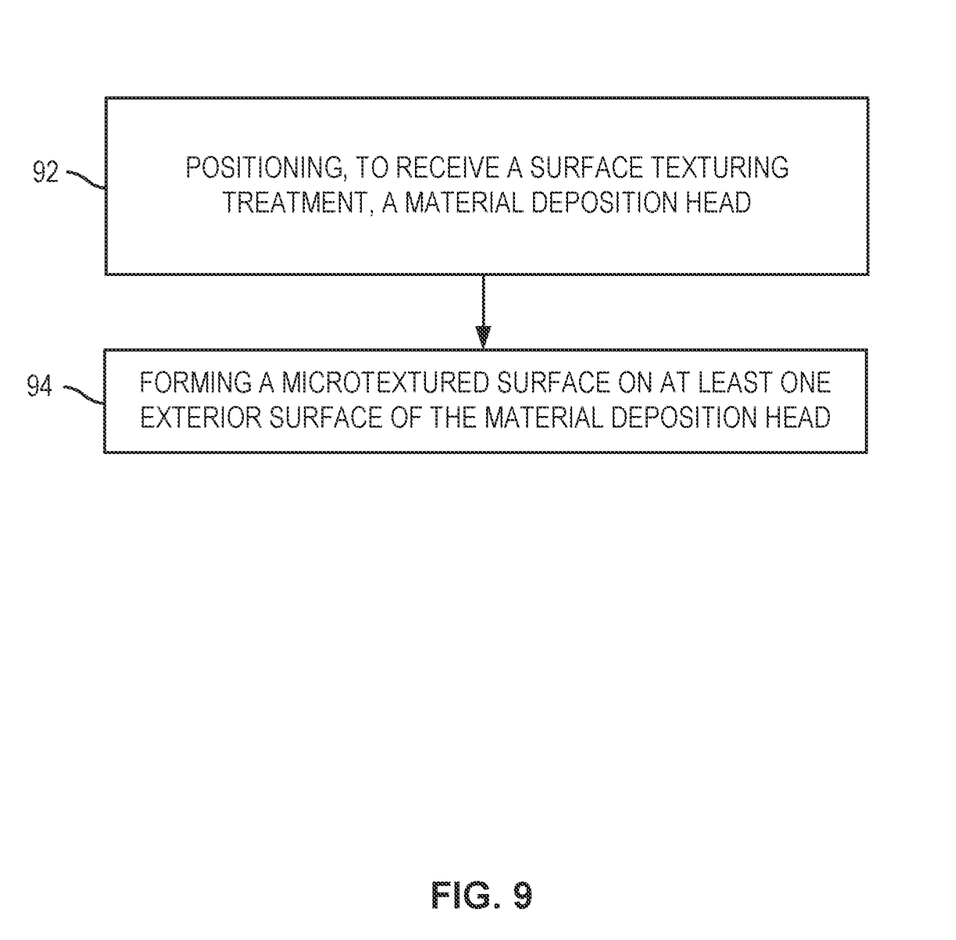
FIG. 9 is a flow diagram illustrating an example technique of this disclosure.

FIG. 9 is a flow diagram illustrating an example technique of forming a microtextured surface on a component of material deposition head 2. The technique includes positioning, to receive a surface texturing treatment, a material deposition head 2 (92). As discussed above, material deposition head 2 may include a first body portion 4 and nozzles 50. First body portion 3 may include first end 6, second end 8, and exterior surface 10 extending from first end 6 to second end 8. Nozzles 50 may be coupled to first body portion 4 at or near second end 8. Nozzles 50 may define exterior surface 57 and material delivery channel 51. Material delivery channel 51 may be fluidically coupled to a fluidized powder source 84 configured to provide a plurality of particles of a material (e.g., fluidized powder 86).

The technique illustrated in FIG. 9 also includes forming microtextured surface 59 on at least one of exterior surface 10 of first body portion 4 or exterior surface 57 of nozzles 50 (94). Microtextured surface 59 is configured to reduce wetting of molten particles (e.g., molten particles 130) of the plurality of particles. In some examples, forming microtextured surface 59 (94) may include subtractive manufacturing of at least one of a first substrate defining first body portion 4 or a second substrate defining nozzles 50. For example, forming microtextured surface 59 (94) may include laser ablating of at least one of a first substrate defining first body portion 4 or a second substrate defining nozzles 50.

In some examples, forming microtextured surface 59 (94) may include applying a coating to at least one of a first substrate defining first body portion 4 or a second substrate defining nozzles 50. In some examples, the coating may be applied to define microtextured surface 59 without further processing. In other examples, after applying the coating, the technique may include subtractive manufacturing of at least a portion of the coating to define microtextured surface 59.

Various examples have been described. These and other examples are within the scope of the following claims.

What is claimed is:

1. A material deposition head comprising:
    a body portion comprising a first end, a second end, and a first exterior surface extending from the first end to the second end; and
    a nozzle coupled to the body portion at or near the second end, wherein the nozzle defines a second exterior surface and a material delivery channel, wherein the material delivery channel is fluidically coupled to a fluidized powder source configured to provide a plurality of particles of a material,
    wherein at least one of the first exterior surface or the second exterior surface comprises a microtextured surface configured to reduce a wettability of molten particles of the plurality of particles thereon, wherein the microtextured surface comprises a plurality of features, wherein a density of the plurality of features is greater than about 100 features per square millimeter.

2. The material deposition head of claim 1, wherein the microtextured surface is configured to trap gas between the molten particles and a nominal plane of the first exterior surface or the second exterior surface.

3. The material deposition head of claim 1, wherein the microtextured surface comprises a plurality of features, and wherein the microtextured surface has a surface energy configured to prevent envelopment of a feature of the plurality of features by the molten particles.

4. The material deposition head of claim 1, wherein the microtextured surface defines a patterned surface comprising a plurality of regularly repeating features.

5. The material deposition head of claim 1, wherein the microtextured surface defines an irregular surface comprising a plurality of nonregular features.

6. The material deposition head of claim 1, wherein the microtextured surface comprises a plurality of features, each feature having at least one of a width or a height less than about 90 microns.

7. The material deposition head of claim 1, wherein the microtextured surface comprises a plurality of features, wherein a spacing between adjacent features is less than about 90 microns.

8. The material deposition head of claim 1, wherein the microtextured surface comprises a coating disposed on at least one of a first substrate defining the body portion or a second substrate defining the nozzle.

9. The material deposition head of claim 1, wherein the coating comprises at least one of titanium nitride-based coating or a graphene-based coating.

10. The material deposition head of claim 1, wherein the nozzle comprises a plurality of nozzles.

11. A system comprising:
    a fluidized powder source configured to provide a plurality of particles of a material;
    a material deposition head comprising:
        a body portion comprising a first end, a second end, and a first exterior surface extending from the first end to the second end; and
        a nozzle coupled to the body portion at or near the second end, wherein the nozzle defines a second exterior surface and a material delivery channel, wherein the material delivery channel is fluidically coupled to the fluidized powder source,
        wherein at least one of the first exterior surface or the second exterior surface comprises a microtextured surface configured to reduce a wettability of molten particles of the plurality of particles thereon, wherein the microtextured surface comprises a plurality of features, wherein a density of the plurality of features is greater than about 100 features per square millimeter.

12. The system of claim 11, wherein the microtextured surface is configured to trap gas between the molten particles and a nominal plane of the first exterior surface or the second exterior surface.

13. The system of claim 11, wherein the microtextured surface defines a patterned surface comprising a plurality of regularly repeating features.

14. The system of claim 11, wherein the microtextured surface defines an irregular surface comprising a plurality of nonregular features.

15. The system of claim 11, wherein the microtextured surface comprises a plurality of features, each feature having at least one of a width or a height less than about 90 microns.

16. A method comprising:
    positioning, to receive a surface texturing treatment, a material deposition head comprising:
        a body portion comprising a first end, a second end, and a first exterior surface extending from the first end to the second end; and
        a nozzle coupled to the body portion at or near the second end, wherein the nozzle defines a second exterior surface and a material delivery channel, wherein the material delivery channel is fluidically coupled to a fluidized powder source configured to provide a plurality of particles of a material; and
    forming a microtextured surface on at least one of the first exterior surface or the second exterior surface, wherein the microtextured surface is configured to reduce wetting of molten particles of the plurality of particles, wherein the microtextured surface comprises a plurality of features, wherein a density of the plurality of features is greater than about 100 features per square millimeter.

17. The method of claim 16, wherein forming the microtextured surface comprises subtractive manufacturing of at least one of a first substrate defining the body portion or a second substrate defining the nozzle.

18. The method of claim 16, wherein forming the microtextured surface comprises laser ablating of at least one of a first substrate defining the body portion or a second substrate defining the nozzle.

19. The method of claim 16, wherein forming the microtextured surface comprises applying a coating to at least one of a first substrate defining the body portion or a second substrate defining the nozzle.

\* \* \* \* \*